(12) United States Patent
Sweeney et al.

(10) Patent No.: US 6,658,989 B2
(45) Date of Patent: Dec. 9, 2003

(54) RE-USABLE BEVERAGE FILTER CARTRIDGE

(75) Inventors: Richard P. Sweeney, Winchester, MA (US); Nicholas G. Lazaris, Newton, MA (US); Roderick H. Beaulieu, Cumberland, RI (US)

(73) Assignee: Keurig, Incorporated, Wakefield, MA (US)

( * ) Notice: Subject to any disclaimer, the term of this patent is extended or adjusted under 35 U.S.C. 154(b) by 0 days.

(21) Appl. No.: 10/115,768

(22) Filed: Apr. 3, 2002

(65) Prior Publication Data

US 2002/0148358 A1 Oct. 17, 2002

Related U.S. Application Data

(60) Provisional application No. 60/283,290, filed on Apr. 11, 2001.

(51) Int. Cl.⁷ .............................. A47J 31/06; A47J 31/44
(52) U.S. Cl. .............................. 99/315; 99/306; 99/322; 99/323
(58) Field of Search .......................... 99/323, 322, 317, 99/304, 306, 307, 295, 312, 314, 315

(56) References Cited

U.S. PATENT DOCUMENTS 2,997,940 A * 8/1961 Pecoraro et al. .............. 99/317
3,007,392 A * 11/1961 Pecoraro et al. .............. 99/307
5,240,722 A * 8/1993 Louridas .................... 99/295 X
6,189,438 B1 * 2/2001 Bielfeldt et al. .......... 99/322 X

FOREIGN PATENT DOCUMENTS

DE G 9317251 3/1994
EP 1016365 7/2000
WO WO 9856285 12/1998

* cited by examiner

Primary Examiner—Reginald L. Alexander
(74) Attorney, Agent, or Firm—Samuels, Gauthier & Stevens

(57) ABSTRACT

For use in a single serve beverage brewer in which a measured charge of a dry beverage medium is infused with a metered amount of heated liquid to produce a beverage medium, a reusable beverage filter cartridge is provided for containing the beverage medium and for accommodating an inflow of the heated liquid and an outflow of the beverage medium. The cartridge comprises a cup-shaped housing having a top opening and a closed bottom with an outlet port. A filter internally subdivides the housing into a first chamber accessible via the top opening and configured and dimensioned to contain the beverage medium, and a second chamber communicating with the outlet port. A lid is removably secured to the housing in a position closing the top opening, and an inlet port in the lid serves to admit heated liquid into the first chamber for infusion with the beverage medium contained therein. The filter is permeable to accommodate a flow therethrough of the resulting beverage into the second chamber from which it exits via the outlet port.

3 Claims, 2 Drawing Sheets

RE-USABLE BEVERAGE FILTER CARTRIDGE

CROSS REFERENCE TO RELATED APPLICATION

This application claims priority from provisional patent application Serial No. 60/283,290 filed Apr. 11, 2001.

BACKGROUND DISCUSSION

1. Field of the Invention

This invention relates generally to single serve beverage brewers, and is concerned in particular with the provision of a reusable beverage filter cartridge for use in such brewers.

2. The Prior Art

As disclosed for example in U.S. Pat. Nos. 5,325,765 (Sylvan et al.); 5,840,189 (Sylvan et al.); and 6,082,247 (Beaulieu), it is known to employ disposable beverage filter cartridges that are pierced during the brewing cycle of single serve beverage brewers. Although such cartridges function in an entirely satisfactory and user friendly manner, the need to dispose of them after only a single use has raised concerns on the part of environmentalists.

SUMMARY OF THE INVENTION

An objective of the present invention is to deal with these concerns by providing a filter cartridge designed for reuse in successive brewing cycles.

A companion objective of the present invention is the realization cost savings resulting from the repeated rather than single use and disposal of cartridge units.

These and other objectives and advantages of the present invention will now be described in greater detail with reference to the accompanying drawing, wherein:

DETAILED DESCRIPTION OF PREFERRED EMBODIMENT

Figure 4:
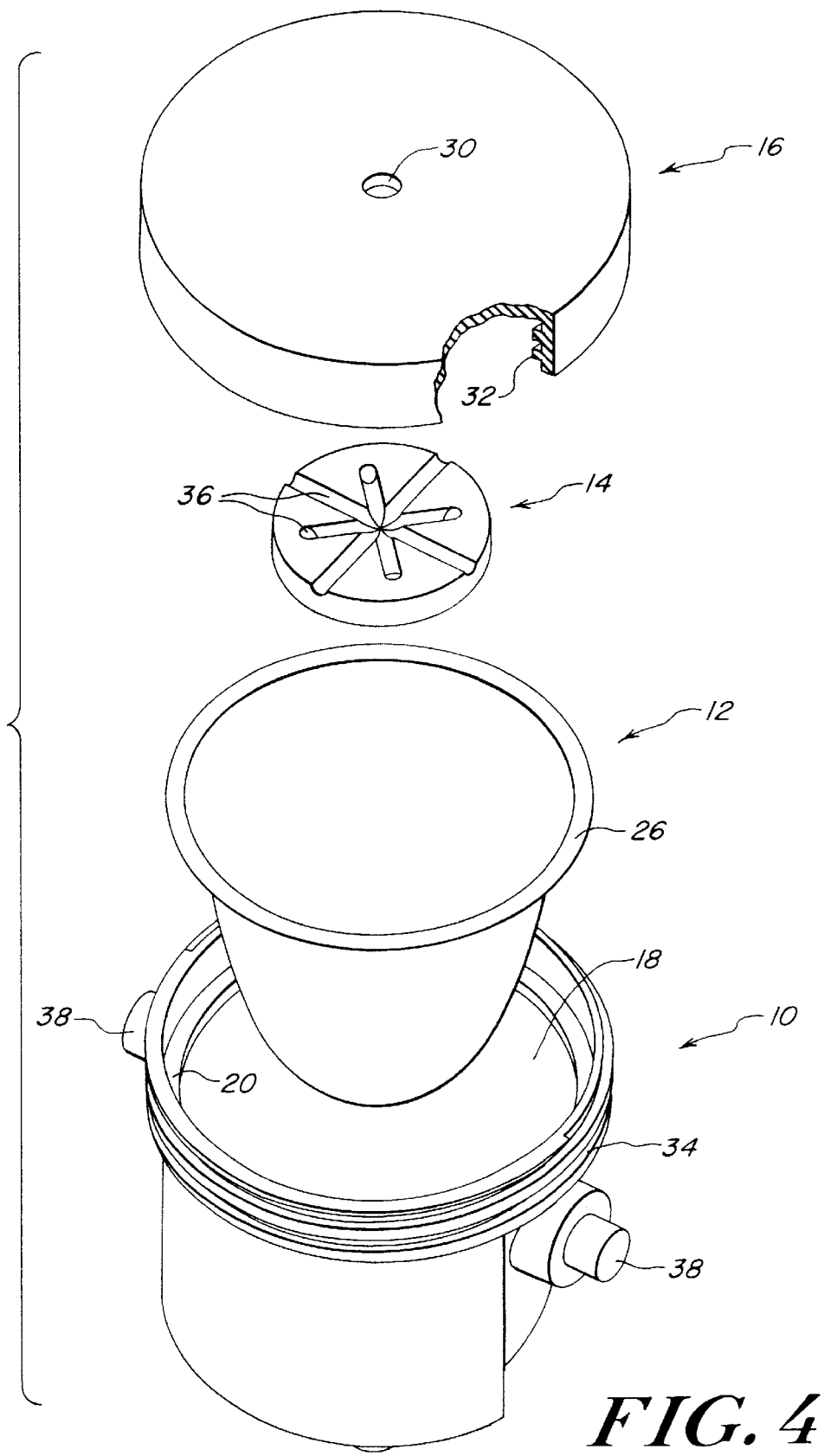
FIG. 4 is an exploded view of the components of the beverage filter cartridge.

With reference initially to FIG. 4, it will be seen that the reusable beverage filter cartridge of the present invention includes a cup-shaped housing 10, a permeable filter 12, a flow diffusing baffle 14, and a lid 16.

Figure 1:
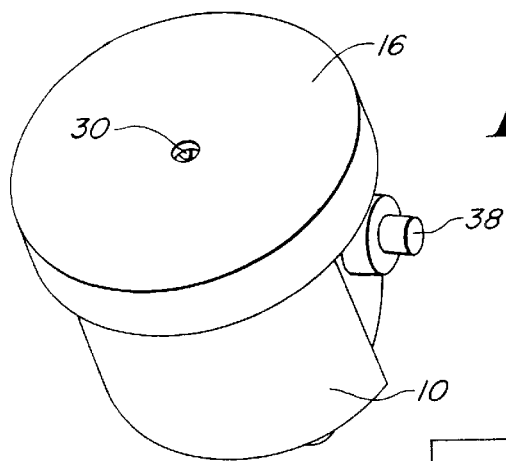
FIG. 1 is a perspective view of a reusable beverage filter cartridge in accordance with the present invention.
Figure 2:
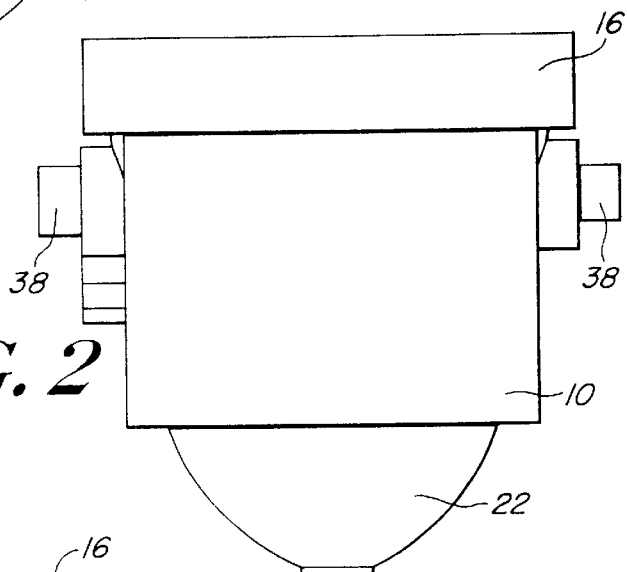
FIG. 2 is a front view on an enlarged scale of the beverage filter cartridge.
Figure 3:
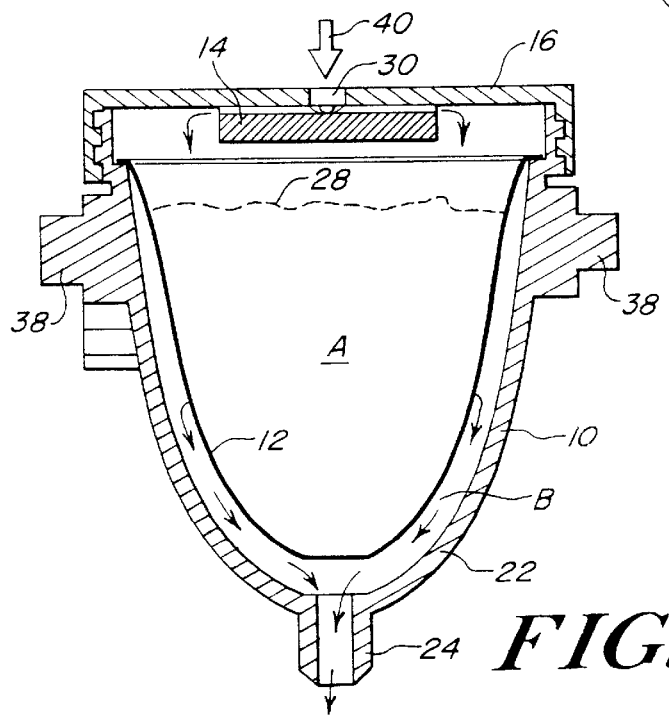
FIG. 3 is a vertical sectional view taken through the beverage filter cartridge.

The cup-shaped housing 10 has a top opening 18 surrounded by an internal circular ledge 20, and a closed bottom 22 converging to an outlet port 24. The filter 12 is also generally cup-shaped, but smaller than the housing 10, with a circular peripheral lip 26. When the filter is received in the housing, as shown in FIG. 3, the lip 26 rests on the ledge 20, and the interior of the housing is subdivided by the filter into a first chamber "A" accessible via the top opening 18, and a second chamber B communicating with the outlet port 24. The first chamber is configured and dimensioned to receive a measured charge of a dry beverage medium 28, typically ground roasted coffee.

The lid 16 has an inlet port 30 and is internally threaded as at 32 for removable attachment to an externally threaded collar 34 on the housing 10.

The baffle 14 underlies the lid 16 and comprises a circular disc having its center aligned with the inlet port 30. The upper surface of the disc is interrupted by grooves 36, preferably of differing lengths, emanating from the disc center.

The reusable cartridge may serve as a substitute for a disposable cartridge and cartridge holder of the type disclosed, for example, in U.S. Pat. No. 6,079,315 (Beaulieu et al.), the description of which is herein incorporated by reference. To this end, the housing may be provided with oppositely disposed externally projecting trunnions 38.

The filter 12 may be removably received in the housing 10, or alternatively, it may be fixed in place. Other mechanically equivalent means may be employed to removably attach the lid to the housing, and the lid and housing may be provided, respectively with multiple inlet and outlet ports.

In use, the lid 16 is removed and a measured charge of a beverage medium is deposited in the filter 12 in chamber A. The lid is then closed, and a metered amount of heated liquid is injected as at 40 into the cartridge inlet opening 30. The liquid is diffused by the radial grooves 36 in baffle 14 before infusing with the beverage medium 28 to produce a brewed beverage. The beverage flows through the filter into chamber B from which it exits via outlet port 24. At the conclusion of the brewing cycle, the lid 16 may be opened to allow removal of the spent grounds of the beverage medium, and the filter and cartridge interior may be flushed in readiness for the next brewing cycle.

We claim:

1. For use in a single serve beverage brewer in which a measured charge of a dry beverage medium is infused with a metered amount of heated liquid to produce a beverage medium, a reusable beverage filter cartridge for containing the beverage medium and for accommodating an inflow of said heated liquid and an outflow of said beverage medium, said cartridge comprising:

a cup-shaped housing having a top opening and a closed bottom;

an outlet port in said closed bottom;

a filter internally subdividing said housing into a first chamber accessible via said top opening and a second chamber communicating with said outlet port, said first chamber being configured and dimensioned to contain said beverage medium;

a lid;

means for removably securing said lid to said housing in a position closing said top opening;

an inlet port in said lid for admitting heated liquid into said first chamber for infusion with a beverage medium contained therein, said filter being permeable to accommodate a flow therethrough of the resulting beverage into said second chamber and out through said outlet port; and baffle means underlying said lid for diffusing the heated liquid received in said first chamber via said inlet port, said baffle means comprising a circular disc having its center aligned with said inlet port, and having an upper surface interrupted by grooves emanating from said center.

2. The cartridge of claim 1 wherein said filter is removably received in said housing.

3. The cartridge of claim 1 wherein said filter includes a circular peripheral lip configured and dimensioned to be supported on a circular ledge surrounding said top opening.

* * * * *